United States Patent [19]

Higashi

[11] Patent Number: 4,870,450
[45] Date of Patent: Sep. 26, 1989

[54] LASER IMAGER

[75] Inventor: Masato Higashi, Sagamihara, Japan

[73] Assignee: Minolta Camera Kabushiki Kaisha, Osaka, Japan

[21] Appl. No.: 318,515

[22] Filed: Mar. 6, 1989

Related U.S. Application Data

[63] Continuation of Ser. No. 86,944, Aug. 18, 1987, abandoned.

[30] Foreign Application Priority Data

Aug. 22, 1986 [JP] Japan .................................. 61-197878

[51] Int. Cl.[4] ......................... G03B 27/32; G03B 27/52
[52] U.S. Cl. ........................................ 355/27; 355/106; 355/100
[58] Field of Search ..................... 355/27, 28, 29, 100, 355/106

[56] References Cited

U.S. PATENT DOCUMENTS 2,430,687 11/1947 Sabel et al. ............................. 355/27
3,743,413 7/1973 Sharp et al. ............................ 355/29

Primary Examiner—Monroe H. Hayes
Attorney, Agent, or Firm—Wenderoth, Lind & Ponack

[57] ABSTRACT

A laser imager has a laser image forming apparatus and an automatic developing apparatus transporting photosensitive sheets at a lower speed than the former and which is adapted to successively produce prints efficiently without a trailing sheet interfering with the transport of a leading sheet in the path of transport. The laser imager has a control device for judging whether or not two photosensitive sheets would overlap each other while the sheets are being transferred in succession from a transport device of the image forming apparatus to a transport device of the developing apparatus, and for controlling the sheet transport timing based on the result of the judging.

23 Claims, 6 Drawing Sheets

LASER IMAGER

This application is a continuation, of now abandoned application Ser. No. 086,944, filed 8/18/87, now abandoned.

BACKGROUND OF THE INVENTION

The present invention relates to a laser imager which comprises a laser image forming apparatus for forming images on a photosensitive material by projecting a laser beam on the material, and an automatic developing apparatus for developing the images formed by the apparatus.

Generally, laser image forming apparatuses and automatic developing apparatuses have heretofore been used independently of each other. Recently, however, attempts are made to use the two apparatus in combination to form images with a laser beam and to automatically develop the resulting images in a continuous process.

Laser imagers comprising such a laser image forming apparatus and an automatic developing apparatus in combination have a problem. When the laser image forming process is initiated for a photosensitive sheet after the automatic developing process for the preceding photosensitive sheet has been completed, interference between the preceding sheet and the following sheet in the path of transport is unavoidable thereby contributing to a low printing efficiency.

Accordingly, it to desirable to start the image forming process for the following sheet upon the completion of the image forming process for the preceding sheet. Nevertheless, the leading end of the following sheet is likely to overtake the rear end of the preceding sheet before the rear end of the preceding sheet is transferred from the laser image forming apparatus to the automatic developing apparatus since the latter apparatus operates at a lower sheet transport speed than does the former. The problem of overlapping could therefore occur during transport.

Although photosensitive sheets are transported usually at a definite speed within the laser image forming apparatus, it is desirable that the sheet transport speed in the automatic developing apparatus be variable according to the developing conditions. It is therefore desirable to achieve the highest possible printing efficiency in conformity with the transport speed without allowing the following sheet to interfere with the preceding sheet in the path of transport.

SUMMARY OF THE INVENTION

A first object of the present invention is to provide a laser imager of the type described above wherein photosensitive sheets can be successively processed for printing with the highest possible efficiency without any interference between photosensitive sheet and a preceding sheet in the path of transport even through the automatic developing apparatus operates at a lower sheet transport speed than does the laser image forming apparatus.

A second object of the invention is to provide a laser imager of the type described above which is characterized in that judging means for detecting the possible interference in the transport path is capable of making an accurate prediction to assure a high efficiency in producing prints successively.

A third object of the invention is to provide such a laser imager with control means for transporting the photosensitive sheet at a proper time when the judging means predicts the interference in the transport path.

A fourth object of the invention is to provide a laser imager which is adapted to effect proper control in accordance with the length of photosensitive sheets and the sheet transport speed of the laser image forming apparatus as well as of the automatic developing apparatus to preclude the interference in the transport path and to assure successive printing with a high efficiency.

A fifth object of the invention is to provide a laser imager comprising a laser image forming apparatus and an automatic developing apparatus which operates at a lower transport speed than does the image forming apparatus and in which the transport speed is adjustable to assure optimum development under various conditions, the laser imager being adapted to efficiently produce prints in succession under an optimum condition in accordance with transport speed of the developing apparatus without permitting the interference in the transport path.

A sixth object of the invention is to provide a laser imager of the type described above wherein the transport speed of the automatic developing apparatus is adjustable and which includes sensors for detecting the transport speed of the automatic developing apparatus and for precluding the interference in the transport path.

Other objects and features of the present invention will become apparent from the following description with reference to the accompanying drawings.

DETAILED DESCRIPTION OF THE PREFERRED EMBODIMENT

An embodiment of the invention will be described below with reference to the drawings.

Figure 1:
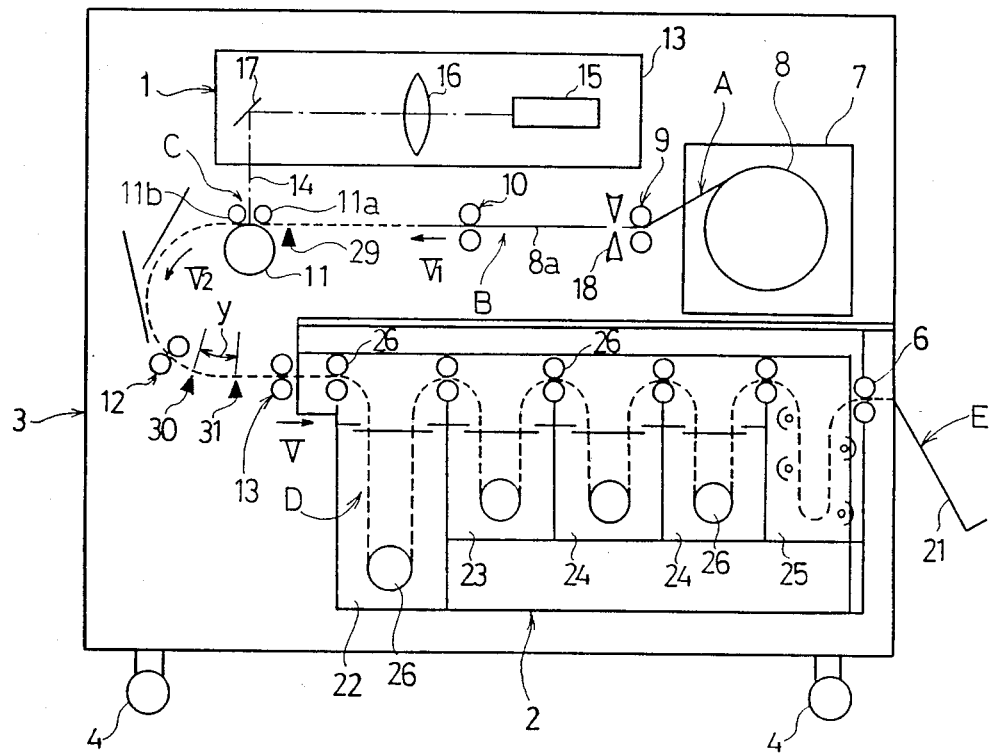
FIG. 1 is a side elevation view schematically showing a laser imager embodying the invention.

FIG. 1 shows a laser imager comprising a laser image forming apparatus 1 and an automatic developing apparatus 2 which are housed in a main body 3. The main body 3 is movably supported by casters 4. The developing apparatus 2 is provided under the image forming apparatus 1.

Photosensitive material 8, such as silver salt film or silver salt printing paper, is transported sequentially by: feed means A, feed transport means B, exposure transport means C, development transport means D and discharge station E.

The feed means A comprises a supply magazine 7 and a pair of feed rollers 9. The supply magazine 7 contains the photosensitive material 8 in the form of a roll, which is paid off by the pair of feed rollers 9 and then fed to the feed transport means B.

The feed transport means B comprises a cutter 18 disposed adjacent to the pair of feed rollers 9 and a pair of conveyor rollers 10. The material 8 supplied from the feed means A to the transport means B is cut by the cutter 18 into a photosensitive sheet 8a having a desired length. The sheet 8a is forwarded by the conveyor rollers 10 until the leading end thereof reaches a position adjacent to and upstream from an exposure station P of the laser image forming apparatus 1.

The exposure station P is positioned at the upstream end of the exposure transport means C, which receives the sheet 8a from the feed transport means B and transports the sheet toward the development transport means D. Arranged at the exposure station P are a subscanning roller 11 and a pair of driven rollers 11a, 11b in contact therewith. At the exposure station P, the image forming apparatus 1 projects a laser beam 14 on the sheet 8a traveling through the station P to form an image thereon.

The laser image forming apparatus 1 includes a laser light source 15 for emitting a laser beam 14 in accordance with a predetermined image signal. By main scanning means, the laser beam 14 is reflected and swept perpendicular to the direction of transport of the sheet 8a and is then projected onto the sheet 8a via a collimator lens 16 and a reflecting mirror 17. While the sheet 8a is transported as nipped between the subscanning roller 11 and the driven rollers 11a, 11b, the transport directly influences the quality of the image to be obtained and must therefore be effected with high precision.

When the subscanning roller 11 starts to transport the leading end of the sheet 8a, the exposure thereof with the laser beam 14 is initiated, permitting the sheet 8a to advance along the path of transport as facilitated by the exposure transport means C. The rear end of the sheet 8a is released from the subscanning roller 11 at the completion of the exposure, whereupon the sheet 8a reaches a pair of first transport rollers 12 of the development transport means D under gravity. The exposure transport means C may be provided with a pair of specific rollers or the like for forcibly transferring the sheet 8a from the subscanning roller 11 to the pair of first transport rollers 12.

The development transport means D comprises the pair of first transport rollers 12 and a pair of second transport rollers 13 which are arranged in the transport path upstream of the developing apparatus 2. A transport mechanisms 26 is arranged in the path within the developing apparatus 2. The first and second transport rollers 12, 13 feed the sheet 8a to the apparatus 2, which develops the image formed on the sheet 8a by developing the image into a visible image. The sheet 8a is thereafter delivered by a pair of discharge rollers 6 onto a tray 21 at the discharge station E. The automatic developing apparatus 2 has a color developing chamber 22, a bleaching-fixing chamber 23, two rinsing chambers 24, 24 and a drying chamber 25. The sheet 8a is passed through the series of chambers for development.

Figure 2:
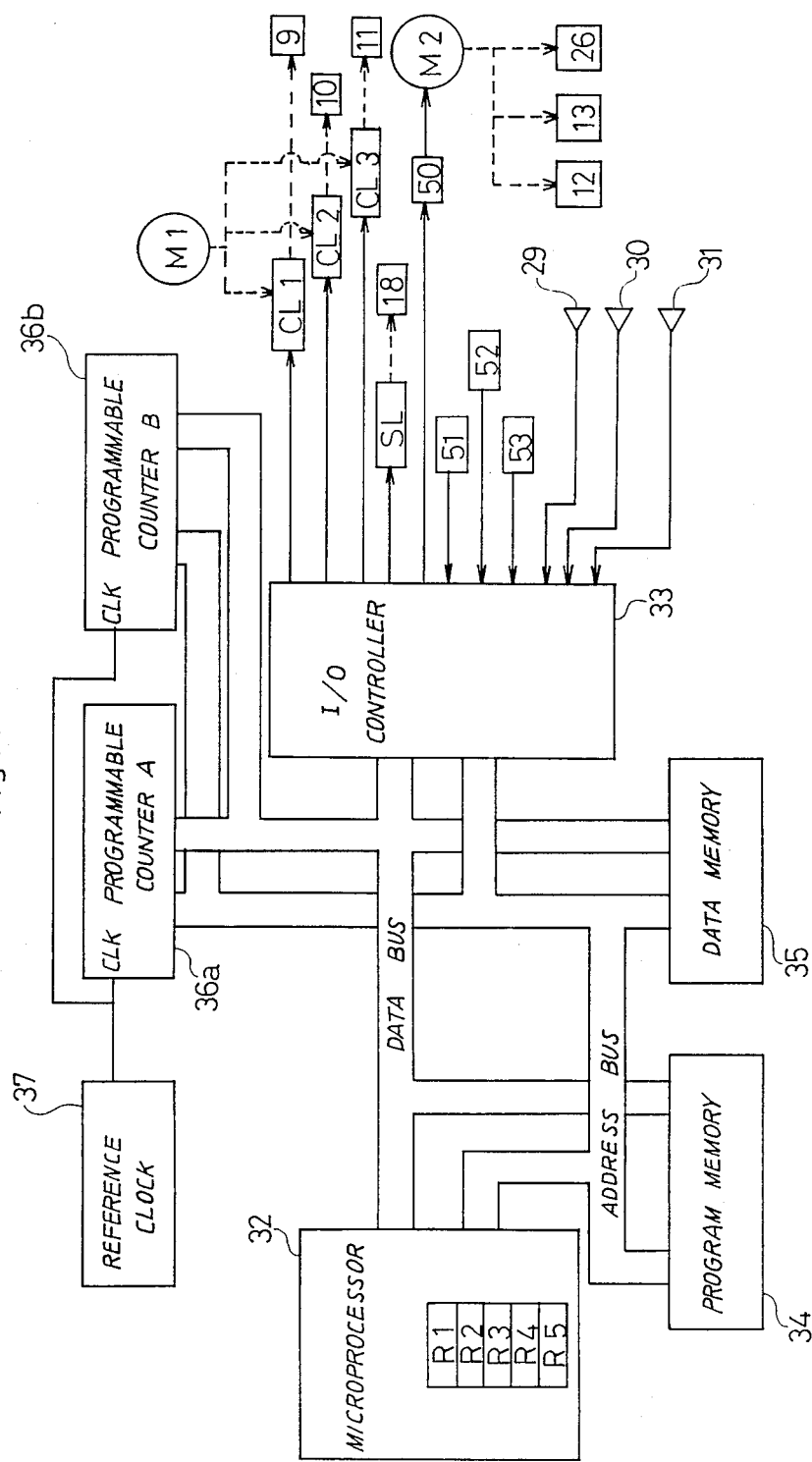
FIG. 2 is a block diagram showing a circuit for controlling the transport timing of photosensitive material.

With reference to FIGS. 1 and 2, the motors for transporting the sheet 8a and the sensors, etc. for timing the transport of sheets 8a will now be described.

A motor M1 drives the pair of feed rollers 9 of the feed means A and the pair of conveyor rollers 10 of the feed transport means B via clutches CL1 and CL2, respectively. The cutter 18 of the feed transport means B operates upon the energization of a solenoid SL.

The motor M1 also drives the subscanning roller 11 of the exposure transport means C via a clutch CL3. The speed of transport of the sheet 8a by the subscanning roller 11, namely V2 (subscanning speed), is equal to the speed of transport V1 by the feed transport means B but can be lower than V1.

A motor M2 drives the pairs of first and second transport rollers 12, 13 of the development transport means D and the transport mechanisms 26 within the developing apparatus 2 to transport the sheet 8a at a speed V. This transport speed V is variable by altering the speed of rotation of the motor M2 by a speed control circuit 50. The speed V is adjustable by the user or serviceman, for example, by manipulating keys on the control panel so as to control the development processing time in accordance with varying factors such as the degree of deterioration of the developer, temperature change, degrees of sensitivity of the photosensitive sheet 8a, etc. The speed V is smaller than the transport speed V2 (subscanning speed) of the exposure transport means C.

The feed rollers 9 of the feed means A, the conveyor rollers 10 of the feed transport means B and the subscanning roller 11 of the exposure transport means C are operated when required by the engagement of the clutches CL1, CL2 and CL3, respectively. On the other hand, the first and second transport rollers 12, 13 and the transport mechanisms 26 of the development transport means D are continuously operated.

At the downstream end of the feed transport means B, i.e. at a location close to and upstream from the exposure station P, a sensor 29 is disposed for detecting whether the leading end of the sheet 8a has reached the position. Between the roller pair 12 and the roller pair 13 of the development transport means D are a first sensor 30 and a second sensor 31 which are spaced apart by a specified distance y for detecting the passage of the sheet 8a. These sensors 29, 30 and 31 can be microswitches, ultrasonic sensors or the like.

The transport speed V of the development transport means D can be set based on the distance y and the time t required for the leading end of the sheet 8a to travel from the first sensor 30 to the second sensor 31 as measured by these sensors. Alternatively, the transport speed V may be set, for example, by measuring the speed of rotation of the motor M2 with an optical rotary encoder.

The control circuit for the laser imager will be described next with reference to FIG. 2.

A microprocessor 32, I/O controller 33, program memory 34, data memory 35, programmable counter A 36a and programmable counter B 36b are interconnected by a data bus and an address bus as illustrated in FIG. 2.

The program memory 34 has program controlling software stored therein, while the data memory 35 has stored thereing the data required for controlling the imager. The microprocessor 32 has registers R1, R2, R3, R4 and R5.

The I/O controller 33 is provided with output ports connected to the clutches CL1, CL2, CL3 for transmitting the torque of the motor M1 to the pair of feed rollers 9, the pair of conveyor rollers 10 and the subscanning roller 11, the solenoid SL for operating the cutter 18, and the above-mentioned speed control circuit 50 for controlling the speed of rotation of the motor M2 to vary the speed of transport of the sheet 8a by the development transport means D, i.e. by the pairs of first and second transport rollers 12, 13 and the transport mechanism 26. The I/O controller 33 has input ports for receiving signals from a speed change switch 51 for entering a specified speed for transporting the sheet 8a by the developing transport means D, an input key 52 for entering the number of prints, an input key 53 for entering the length of sheet to be cut off from the photosensitive material 8 from the sensor 29 and from the first and second sensors 30, 31.

The programmable counters A and B indicated at 36a and 36b receive clock pulses from a reference clock 37 and being and stop a counting operation according to a program from the microprocessor 32 for accurate time measurement. Stated more specifically, the programmable counter A 36a is used for detecting the length of the sheet 8a in the direction of transport, and the programmable counter B 36b for establishing a waiting time as will be described below.

The operation of the laser imager will be described with reference to the flow charts of FIGS. 3 (a) to (c) and to the time chart of FIG. 4.

In step #1, the number of prints, N, entered by the print number input key 52 is stored in register R1. The length l of sheet 8a entered by the input key 53 is stored in register R2 in step #2. The maximum length of sheets is smaller than the distance between the subscanning roller 11 and the pair of first transport rollers 12.

In step #3, the time l/V1 (wherein V1 is the speed of transport by the feed rollers 9 and the conveyor rollers 10) required for delivering the photosensitive material 8 from the supply magazine 7 according to the sheet length l is computed, and the value obtained is stored in register R3. Step #4 is then executed for the first print.

Figure 3A:
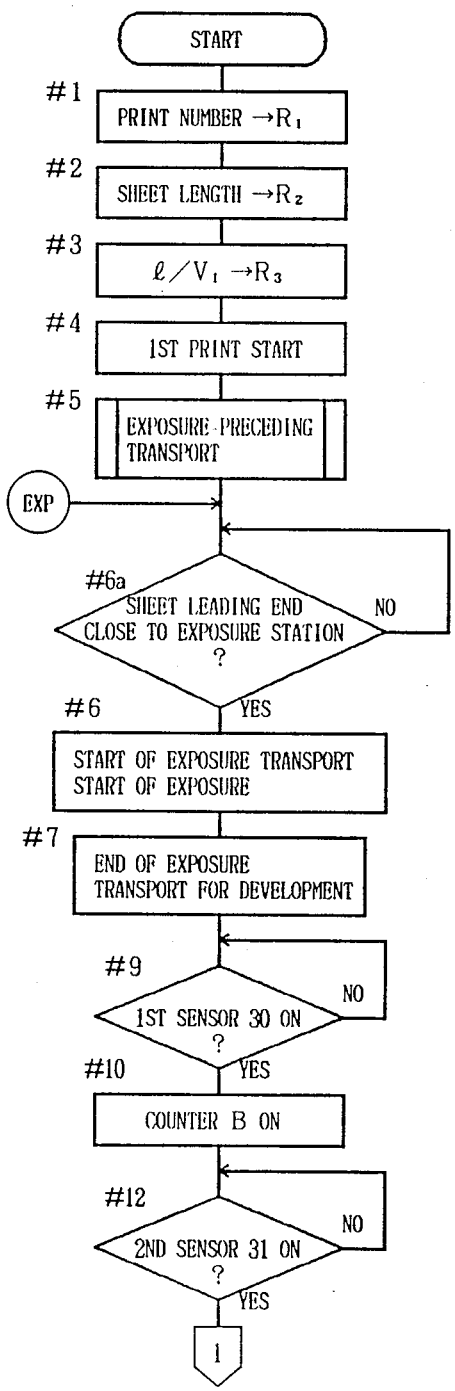
FIGS. 3 (a), (b) and (c) are flow charts for controlling the transport timing of the photosensitive material.
Figure 3B:
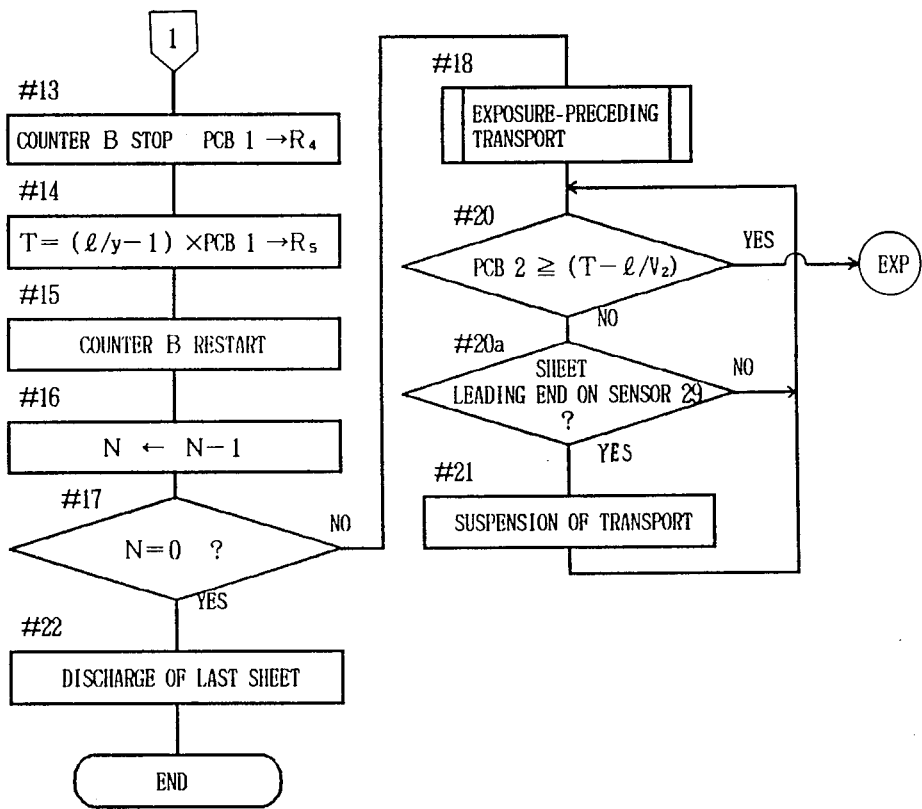
Figure 3C:
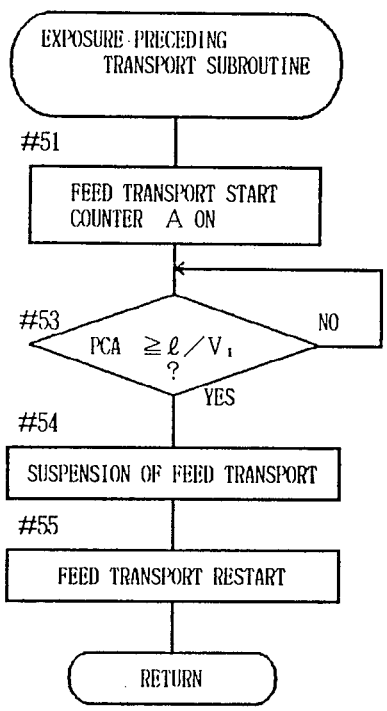
Figure 4:
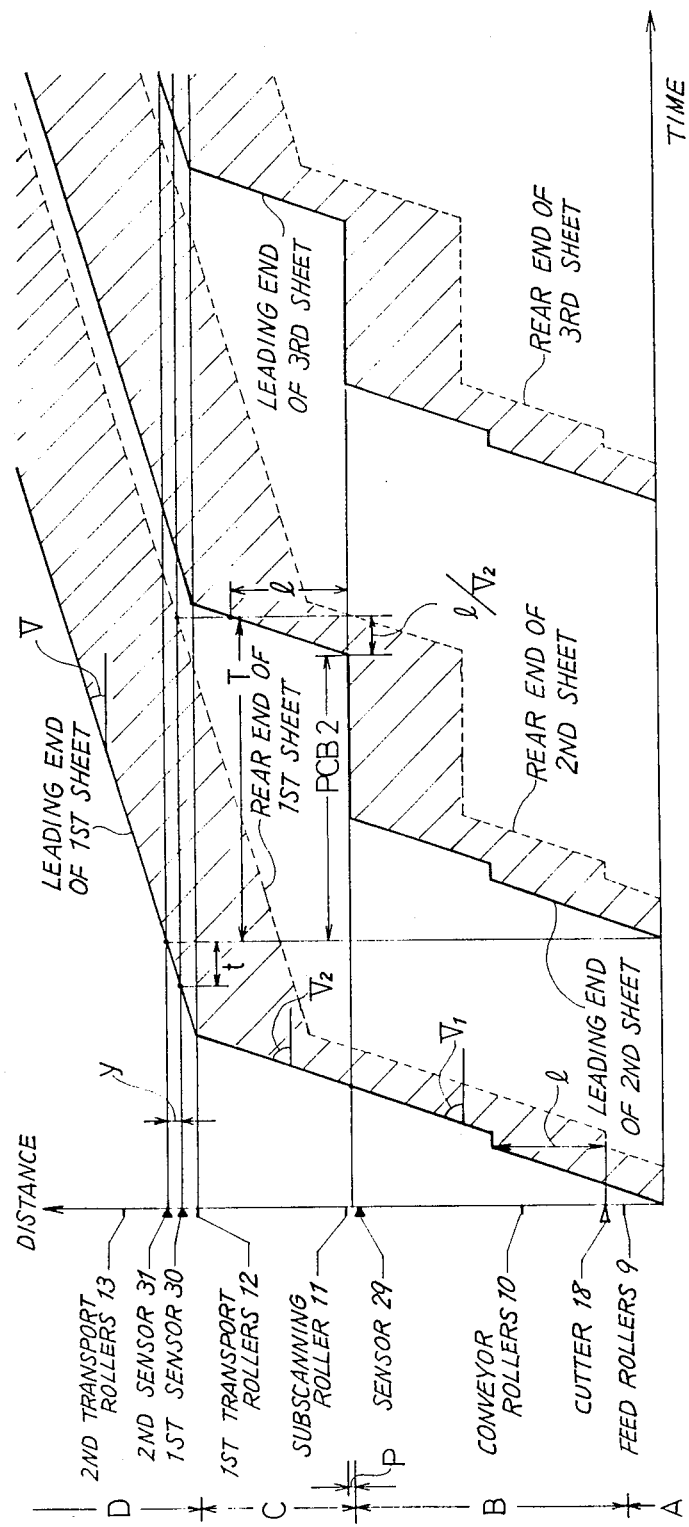
FIG. 4 is a time chart showing an exemplary transport operation for the photosensitive material.

Step #5 is an exposure-preceding transport subroutine having the steps shown in FIG. 3 (c). The clutches CL1 and CL2 are engaged in step #51, driving the feed rollers 9 and the conveyor rollers 10 to start transporting the photosensitive material 8. The counter A is also started. In step #53, the count PCA on the counter A is compared with the value l/V1 stored in the register R3. If PCA≧l/V1, that is, when a length l of the material 8 has been unrolled from the supply magazine 7 and made ready for cutting, step #54 is executed wherein the clutches CL1 and CL2 are disengaged to stop the material 8, and the solenoid SL is energized to cut the material 8 with the cutter 18 to the length l entered by the input key 53. Subsequently, the clutch CL2 is engaged again, sending the cut-off photosensitive sheet 8a toward the exposure station P in step #55.

The sequence then proceeds to step #6a, in which the sensor 29 detects whether the leading end of the sheet 8a has reached a position located immediately adjacent the exposure station P. If the sheet end is detected, step #6 is executed. In this step, the clutch CL3 is engaged to rotate the subscanning roller 11, starting transport of the sheet 8a through the exposure station P and transferring the sheet from the feed transport means B to the exposure transport means C. When a predetermined period of time elapses, the sheet 8a is exposed to a laser beam from the image forming apparatus 1, whereby an image is formed on the sheet 8a. The exposed sheet 8a is sent toward the development transport means D in step #7. The sequence then proceeds to step #9, in which an inquiry is made as to whether the first sensor 30 is on, that is, whether the leading end of the sheet 8a transferred to the development transport means D is detected by the first sensor 30. When the inquiry is answered in the affirmative, the programmable counter B is started up in step #10 for detecting the speed V of sheet transported by the development transport means D. Next, in step #12 an inquiry is made as to whether the second sensor 31 is on, that is, whether the leading end of the sheet 8a is detected by the second sensor 31. If the answer is affirmative, the sequence proceeds to step #13 to stop the counter B and store the count PCB1 in register R4.

Subsequently, in step #14 calculation is performed using the count value PCB1 to determine the time T required for the trailing end of the sheet 8a to pass the first sensor 30 after the leading end passes by the second sensor 31, and the value obtained is stored in the register R3. The time T is given by the following equation:

$$T = l/Y \times PCB1 - PCB1 = (l/Y - 1) \times PCB1$$

wherein y is the distance between the first sensor 30 and the second sensor 31, l is the length of the sheet 8a stored in the register R2, and PCB1 is the time stored in the register R4 and required for the transport of the sheet 8a from the first sensor 30 to the second sensor 31. In the equation above, $l/Y \times PCB1$ represents the time required for the entire sheet 8a to move past the first sensor 30.

The programmable counter B is then reset and thereafter restarted (step #15). In step #16, 1 is substracted from the value N stored in register R1. In step #17 a check is made as to whether the specified number of prints are completed. If N=0, that is, when the required number of prints are completed, step #22 is executed in which the last sheet 8a is transported to the discharge station E, whereby the overall process is completed.

When at least two prints are to be made, the printing operation has not yet been completed after the first sheet 8a has been transferred from the exposure transport means C to the development transport means D, and accordingly, the sequence proceeds to step #18 in which the foregoing exposure-preceding transport subroutine is executed again. The second sheet 8a of having the desired length is cut off and transported toward the exposure station P.

Subsequently, in step #20, the count PCB2 on the programmable counter B is checked and compared with (T−l/V2). The count value PCB2 represents the time elapsed from the time the leading end of the first sheet 8a passed the second sensor 31 until the checking time. The value T represents the time required for the trailing end of the sheet 8a to pass the first sensor 30 after the leading end passes by the second sensor 31, while the value l/V2 represents the time required for the exposure of the sheet 8a at the exposure station P. Accordingly, when PCB2≧(T−l/V2), it follows that even when the entire first sheet 8a has been completely transferred from the exposure transport means C to the development transport means D with its trailing end moving past the first sensor 30, the second sheet 8a has not been completely exposed, and the leading end thereof has not reached the pair of first transport rollers 12.

Thus, when a determination is made in step #20 proves to be PCB2≧(T−l/V2), it is change assured that the second sheet is in no way likely to overlap the first sheet at a position upstream from the developing apparatus 2 even if the second sheet 8a being completely exposed is transferred to the development transport means D; as a result, the sequence returns to steps #6a and 6. When the leading end of the second sheet 7a is detected at the location of the sensor 29, the second sheet is transported at the exposure station P and exposed to form an image on the second sheet 8a.

On the other hand, if a determination in step #20 reveals that PCB2<(T−l/V2), the second sheet, when exposed and transported toward the development transport means D, is likely to overlap the first sheet, and the sequence proceeds to, so that step #20a at which an inquiry is made as to whether the leading end of the second sheet is at the location of the sensor 29. If the inquiry is answered in the affirmative, the clutch CL2 is disengaged to discontinue the transport of the sheet in step #21. When the execution of steps #20a and #21 indicate that the leading end of the second sheet 8a is not at the location of the sensor 29, the sheet 8a will be transported toward the subscanning roller 11. Thus, when the leading end is detected by the sensor 29, the transport of the second sheet 8a is discontinued until it is unlikely that sheet 8a will overlap the preceding first sheet if transported.

When PCB2<(T−1/V2), the sequence again proceeds through steps #20 and #21 which results in the second sheet being maintained at the position adjacent to and upstream from the exposure station P without immediately subjecting the sheet to exposure. In the meantime, the first sheet 8a is developed while being forwarded by the development transport means D. PCB2 becomes greater than or equal to (T−1/V2) after a period of time, whereupon the exposure of the second sheet 8a is initiated.

The third to the last sheets 8a are transported in succession in the same manner as above, and while each sheet 8a is being developed in the automatic developing apparatus 2, the following sheet 8a is exposed at the exposure station P. A waiting time interval is provided between the exposure of the preceding sheet 8a and the exposure of the following sheet 8a by the control process performed in steps #6a to #21 to assure a smooth transport without interference between the sheets 8a. Because the waiting time interval is determined in accordance with the transport speed V of the development transport means D, the laser imager can be operated with almost the highest efficiency under various conditions. This will also be apparent from the time chart of FIG. 4.

The present invention also encompasses the foregoing embodiment.

Although the feed means A of the first described embodiment is adapted to supply the photosensitive material 8 in the form of a roll, the feed means A can alternatively be so designed to supply sheets of photosensitive material.

The transport speed V of the developing transport means D, although variable according to the first described embodiment, can be constant according to the invention. The constant speed V is stored in the data memory 35 of the control circuit.

What is claimed is:

1. An image processing apparatus for exposing sheets of photosensitive material to light to form an image thereon and for developing the photosensitive material to develop the image formed thereon, said image processing apparatus comprising:

an exposing means for projecting light, said exposing means including an exposure station toward which the light is projected;
first transport means operatively associated with said exposing means for transporting sheets of photosensitive material one at a time in the apparatus through said exposure station of said exposing means whereby the sheets are exposed to light projected by said exposing means;
developing means for developing an image formed on photosensitive material by light;
second transport means operatively associated with said developing means for transporting sheets of photosensitive material in the apparatus to said developing means to develop the images formed on the sheets,
said second transport means enabling the sheets of photosensitive material to be transported at a transport speed that is lower than that at which the sheets of photosensitive material are transported by said first transport means;
a buffer transport path defined in the apparatus and along which the sheets in the apparatus are guided from said first transport means to said second transport means,
said buffer transport path having a length that is greater than the maximum length of sheets of photosensitive material that are usable in the apparatus;
overlapping judging means for determining, during the transport of successive sheets of photosensitive material in the apparatus, time periods 1/V2 and L/V,
wherein 1 is the length of the sheets used in the apparatus, V2 is the transport speed at which said first transport means transports the sheets through said exposure station, L is the length of part of the first one of said successive sheets that has not reached said second transport means when the second one of said successive sheets has reached said exposure station, and V is the transport speed at which said second transport means transports the sheets,
and for determining whether or not the second one of the successive sheets will overlap the first one of said second sheets during the transport thereof by said first and said second transport means based on said time periods; and
control means operatively connected to said overlapping judging means and said first transport means for controlling said first transport means to suspend the transport of the second one of the successive sheets through the exposure station when said overlapping judging means determines that the overlapping of the successive sheets will occur during the transport thereof by said first and said second transport means, and for controlling said first transport means to transport the second one of the successive sheets through the exposure station when the overlapping judging means determines that there will be no overlapping of the successive sheets during the transport thereof by said first and said second transport means.

2. An image processing apparatus as claimed in claim 1,
wherein said exposing means includes a laser means for emitting a laser to form images on the sheets of photosensitive material.

3. An image processing apparatus as claimed in claim 1,
wherein said overlapping judging means includes sensor means disposed at an upstream end of said second transport means, with respect to the direction in which sheets are transported in the apparatus, for detecting the arrival of sheets at said second transport means.

4. An image processing apparatus for exposing sheets of photosensitive material to light to form an image thereon and for developing the photosensitive material to develop the image formed thereon, said image processing apparatus comprising:

an exposing means for projecting light, said exposing means including an exposure station toward which the light is projected;

first transport means operatively associated with said exposing means for transporting sheets of photosensitive material one at a time in the apparatus through said exposure station of said exposing means whereby the sheets are exposed to light projected by said exposing means;

developing means for developing an image formed on photosensitive material by light;

second transport means operatively associated with said developing means for transporting sheets of photosensitive material in the apparatus to said developing means to develop the images formed on the sheets, said second transport means enabling the sheets of photosensitive material to be transported at a transport speed that is lower than that at which the sheets of photosensitive material are transported by said first transport means;

a buffer transport path defined in the apparatus and along which the sheets in the apparatus are guided from said first transport means to said second transport means, said buffer transport path having a length that is greater than the maximum length of sheets of photosensitive material that are usable in the apparatus;

speed change means operatively connected to said second transport means for allowing the transport speed at which said second transport means transports sheets in the apparatus to be varied;

overlapping judging means for determining, during the transport of successive sheets of photosensitive material in the apparatus, time periods 1/V2 and L/V, wherein 1 is the length of the sheets used in the apparatus, V2 is the transport speed at which said first transport means transports the sheets through said exposure station, L is the length of part of the first one of said successive sheets that has not reached said second transport means when the second one of said successive sheets has reached said exposure station, and V is the transport speed at which said second transport means transports the sheets based on said time periods, and for determining whether or not the second one of the successive sheets will overlap the first one of said second sheets during the transport thereof by said first and said second transport means; and control means operatively connected to said overlapping judging means and said first transport means for controlling said first transport means to suspend the transport of the second one of the successive sheets through the exposure station when said overlapping judging means determines that the overlapping of the successive sheets will occur during the transport thereof by said first and said second transport means, and for controlling said first transport means to transport the second one of the successive sheets through the exposure statement when the overlapping judging means determines that there will be no overlapping of the successive sheets during the transport thereof by said first and said second transport means.

5. An image processing apparatus as claimed in claim 4, wherein said exposing means includes a laser means for emitting a laser to form images on the sheets of photosensitive material.

6. An image processing apparatus as claimed in claim 4, wherein said overlapping judging means includes sensor means disposed at an upstream end of said second transport means, with respect to the direction in which sheets are transported in the apparatus, for detecting the arrival of sheets at said second transport means.

7. An image processing apparatus for exposing sheets of photosensitive material to light to form an image thereon and for developing the photosensitive material to develop the image formed thereon, said image processing apparatus comprising:

image forming means for projecting light at a predetermined location in the apparatus;

sheet supply means for supplying sheets of photosensitive material one at a time past said predetermined location during an image formation process in which an image is formed on each of the sheets by light projected by said image forming means;

development means including developing means in which images formed on the sheets of photosensitive material by said image forming means are developed into visual images, and developing transport means for transporting sheets of photosensitive material into said developing means, said developing means having an inlet through which sheets of photosensitive material are introduced therein in the apparatus, and said developing transport means enabling the sheets to be transported at a speed that is lower than that at which the sheets are supplied by said sheet supply means;

a buffer zone defined in the apparatus between said image forming means and said development means and through which sheets of photosensitive material pass from said image forming means to said developing means in the apparatus, said buffer zone having a length as defined along a path of travel of the sheets of photosensitive material therethrough that is greater than the maximum length of sheets of photosensitive material that are usable in the apparatus;

clock means for measuring the time that elapses once the leading end of a first one of successive sheets of photosensitive material has reached the inlet of said development means; and control means operatively connected to said clock means and said supply means for calculating the difference between the image forming time required to complete the image formation process for the second one of the successive sheets and the developing transport time required for the developing transport means to complete the transport of the first one of the successive sheets, and for controlling said supply means to supply a second one of successive sheets of photosensitive material past said predetermined location once the elapsed time measured by said clock means is greater than said difference.

8. An image processing apparatus as claimed in claim 7, wherein said control means calculates the developing transport time based on the length of the sheets of the photosensitive material used and the speed at which said developing transport means transports sheets in the apparatus.

9. An image processing apparatus as claimed in claim 7, wherein said control means further calculates said image forming time based on the length of the sheets of the photosensitive material used and the speed at which sheets are supplied in the apparatus by said sheet supply means.

10. An image processing apparatus as claimed in claim 7, wherein said control means includes a sensor means disposed at the inlet of said development means for detecting the arrival of leading ends of sheets at said inlet.

11. An image processing apparatus as claimed in claim 9, wherein said image forming means includes a laser means for emitting a laser to form images on the sheets of photosensitive material.

12. An image processing apparatus for exposing sheets of photosensitive material to light to form an image thereon and for developing the photosensitive material to develop the image formed thereon, said image processing apparatus comprising:

image forming means for projecting light at a predetermined location in the apparatus;

sheet supply means for supplying sheets of photosensitive material one at a time past said predetermined location during an image formation process in which an image is formed on each of the sheets by light projected by said image forming means;

development means including developing means in which images formed on the sheets of photosensitive material by said image forming means are developed into visual images, and developing transport means for transporting sheets of photosensitive material into said developing means, said developing means having an inlet through which sheets of photosensitive material are introduced therein in the apparatus, and said developing transport means enabling the sheets to be transported at a speed that is lower than that at which the sheets are supplied by said sheet supply means;

a buffer zone defined in the apparatus between said image forming means and said development means and through which sheets of photosensitive material pass from said image forming means to said developing means in the apparatus, said buffer zone having a length as defined along a path of travel of the sheets of photosensitive material therethrough that is greater than the maximum length of sheets of photosensitive material that are usable in the apparatus;

speed change means operatively connected to said developing transport means for allowing the speed at which said developing transport means transports sheets in the apparatus to be varied;

clock means for measuring the time that elapses once the leading end of a first one of successive sheets of photosensitive material has reached the inlet of said development means; and control means operatively connected to said clock means and said supply means for calculating the difference between the image forming time required to complete the image formation process for the second one of the successive sheets and the developing transport time required for the developing transport means to complete the transport of the first one of the successive sheets, and for controlling said supply means to supply a second one successive sheets of photosensitive material past said predetermined location once the elapsed time measured by said clock means is greater than said difference.

13. An image processing apparatus as claimed in claim 12, wherein said control means calculates the developing transport time based on the length of the sheets of the photosensitive material used and the speed at which said developing transport means transports sheets in the apparatus.

14. An image processing apparatus as claimed in claim 13, wherein said control means further calculates said image forming time based on the length of the sheets of the photosensitive material used and the speed at which sheets are supplied in the apparatus by said sheet supply means.

15. An image processing apparatus as claimed in claim 12, wherein said control means includes a sensor means disposed at the inlet of said development means for detecting the arrival of leading ends of sheets at said inlet.

16. An image processing apparatus as claimed in claim 12, wherein said image forming means includes a laser means for emitting a laser to form images on the sheets of photosensitive material.

17. An image processing apparatus as claimed in claim 12, wherein said control means includes speed sensing means for detecting the speed at which said developing transport means transports sheets in the apparatus.

18. An image processing apparatus as claimed in claim 17, wherein said speed sensing means includes two sensors spaced apart and each disposed alongside a developing path along which sheets are transported by said developing transport means, each of said sensors capable of detecting the edge of a sheet passing along said developing path.

19. An image processing apparatus for exposing sheets of photosensitive material to light to form images thereon and thereafter developing the sheets to produce visual images thereon, said image processing apparatus comprising:

exposing station means for projecting light on the sheets to form images thereon;

first transport means operatively associated with said exposing station means for transporting sheets in succession through said exposure station means whereby the sheets are exposed to light projected by the exposure station means;

developing station means for developing an image formed on the sheets;

a transport path defined in the apparatus and along which transport path the sheets are guided from said first transport means to said developing station means, said transport path having a length that is greater than the maximum length of sheets that are usable in the apparatus;

second transport means operatively associated with said developing station means for transporting the sheets guided along said transport path through said developing station means to develop the images on the sheets;

determining means for determining whether or not a trailing one of successive sheets will overlap the leading one of the successive sheets in the transport path during the transport thereof by the first and the second transport means based on the length of the sheets and transport speeds at which the first and the second transport means are operating under to transport the sheets; and control means for controlling said first transport means to suspend the transport of the trailing one of the sheets when said determining means determines that overlapping of the sheets will occur and until said determining means determines that no overlapping of the sheets will occur and, thereafter, for initiating the transport of the trailing one of the sheets.

20. An image processing apparatus as claimed in claim 19, wherein said exposing station means includes a laser means for emitting a laser to form images on the sheets of photosensitive material.

21. An image processing apparatus as claimed in claim 19, wherein said determining means includes sensor means disposed at an upstream end of said second transport means, with respect to the direction in which sheets are transported in the apparatus, for detecting the arrival of sheets at said second transporting means.

22. An image processing apparatus as claimed in claim 19, and further comprising speed change means operatively connected to said second transport means for allowing the transport speed at which said second transport means transports sheets in the apparatus to be varied.

23. An image processing apparatus for exposing sheets of photosensitive material to light to form images thereon and thereafter developing the sheets to produce visual images thereon, said image processing apparatus comprising:

an exposing station means for projecting light on the sheets to form images thereon;

sheet supply means for supplying sheets in succession through said exposure station means whereby the sheets are exposed to light projected by the exposure station means;

a developing station including developing means for developing an image formed on the sheets, and developing transport means for transporting sheets of photosensitive material in said developing means, said developing means having an inlet through which sheets are introduced therein in the apparatus, and said developing transport means enabling the sheets to be transported at a speed that is lower than that at which the sheets are supplied by said sheet supply means;

a buffer zone defined between said exposing station means and said developing station and through which sheets pass from said exposing station means to said developing station, said buffer zone having a length as defined along a path of travel of the sheets therethrough that is greater than the maximum length of sheets that are usable in the apparatus;

determining means for determining whether or not a trailing one of successive sheets will overlap the leading one of the successive sheets in the buffer zone during the transport thereof based on the length of the sheets and transport speeds at which the sheet supply means and the development transport means are operating under to transport the sheets; and control means for controlling said sheet supply means to suspend the supplying of the trailing one of the sheets when said determining means determines that overlapping of the sheets will occur and until said determining means determines that no overlapping of the sheets will occur and, thereafter, for initiating the supplying of the trailing one of the sheets to the exposing station.

* * * * *